HELMUT BECKER
HORST KRETZER
INVENTOR.

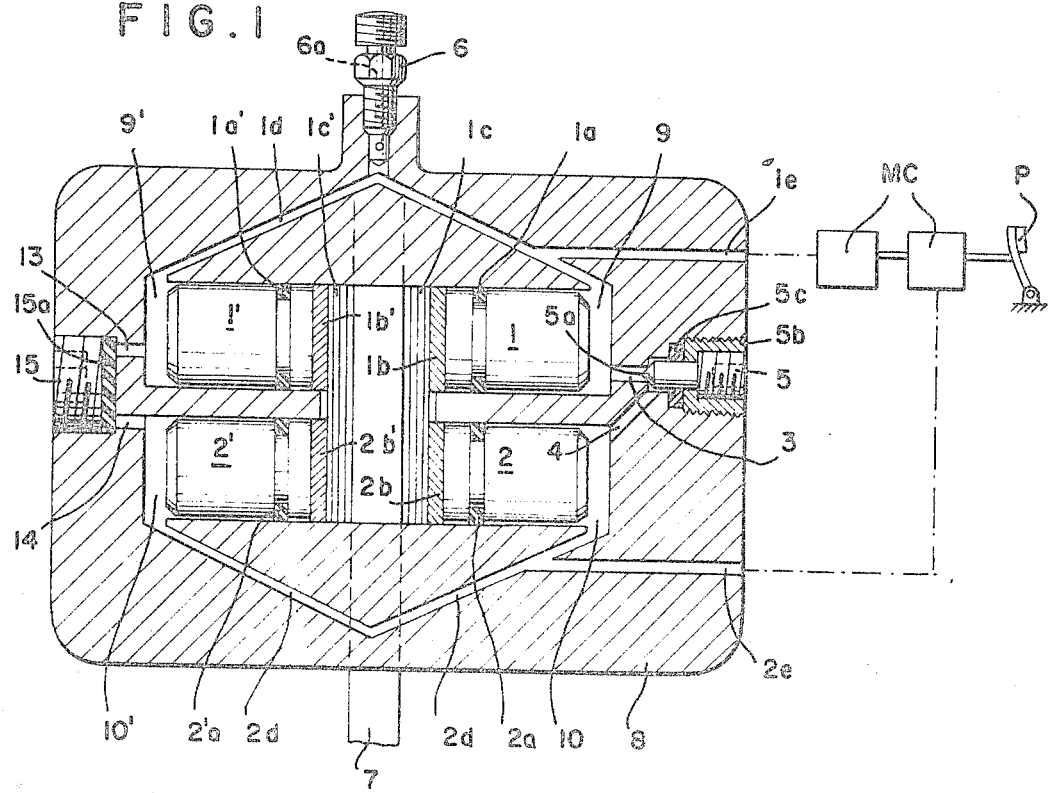
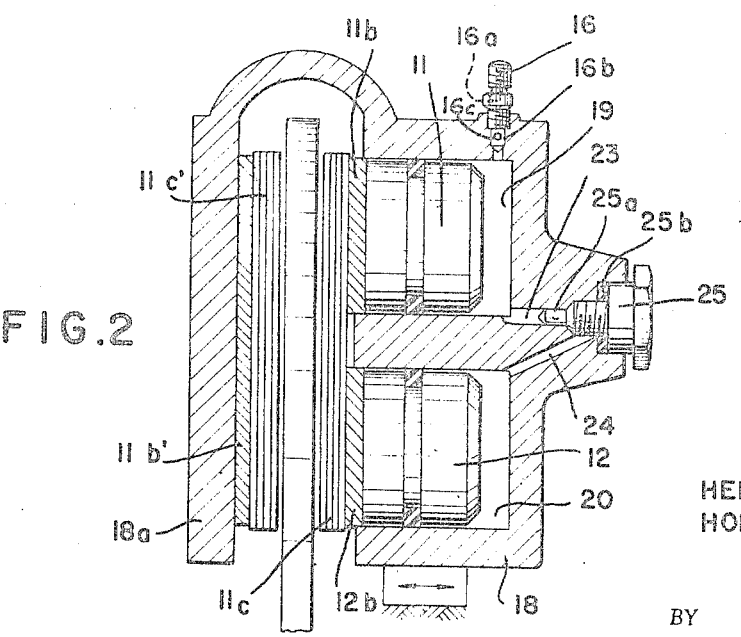

BY
Karl F. Ross
ATTORNEY

United States Patent Office 3,487,896
Patented Jan. 6, 1970

3,487,896
BLEEDING ARRANGEMENT FOR A DUAL-NETWORK HYDRAULIC BRAKE SYSTEM
Helmut Becker and Horst Kretzer, Frankfurt, Germany, assignors to Alfred Teves G.m.b.H., Frankfurt am Main, Germany, a corporation of Germany
Filed May 22, 1968, Ser. No. 731,153
Claims priority, application Germany, May 31, 1967, T 33,994
Int. Cl. B60t 11/10
U.S. Cl. 188—152                    11 Claims

ABSTRACT OF THE DISCLOSURE

A bleeding arrangement for a dual-network hydraulic brake system has a wheel brake with two cylinders connectable to each other through a passage in which a valve is provided. The uppermost of the two cylinders is provided with a bleeder opening so that opening of the valve and of the bleeder opening permits simultaneous bleeding of both cylinders.

---

Our invention relates to an improved bleeding arrangement for a dual-network hydraulic brake system having separate cylinders of each wheel brake associated with the separate networks.

One of the great disadvantages of a dual-network brake system is that the bleeding operations are difficult and tedious compared to that of a single-network brake system. With a conventonal dual-network system at least two bleeder vents, one associated with each network, must be opened at each wheel, and the bleeding of one cylinder through one vent is not necessarily concurrent with that through the other. Because of this, bleeding operation generally consists of several steps: the opening of the bleeder vent or vents associated with one of the brake networks at one wheel brake; the bleeding of the cylinder or cylinders connected thereto; closing of the vent or vents; the repetition of the same process for the other network at that wheel brake; and, finally, the repetition of the preceding steps for the remaining brake wheel brakes.

At best this is a cumbersome, time-consuming operation. In the case of a four-cylinder fixed-yoke disk brake it is even worse. Here each of the lower cylinders is customarily provided with its own bleeder vent while the two upper cylinders are bled through a single vent connected to their hydraulic supply line. Thus, three bleeder vents must be manipulated for bleeding of a single wheel brake.

It is the object of our invention to simplify the bleeding operations of a dual-network brake system.

Another object is to provide improved means of the character described which makes it possible to bleed all the cylinders of one wheel brake in one simple operation.

These objects are attained by providing a bleeding arrangement wherein two cylinders of a wheel brake, each cylinder connected to one brake network, are connectable with each other through a passage in which a valve is provided. The uppermost of the two cylinders is provided with a bleeder vent so that opening of the valve and of the bleeder vent permits simultaneous bleeding of both cylinders.

The above-described arrangement lends itself equally well to all dual-network brake systems whether they are equipped with disk or drum brakes and whether they have two or four wheel-brake cylinders. In all cases only one bleeder vent is needed at each wheel, and both networks can be bled simultaneously.

With a four-cylinder fixed-yoke disk brake two such interconnection valves are provided, one on each side of the brake and the one bleeder vent is provided in the hydraulic line between the two uppermost cylinders.

The valve is preferably a simple screw with a cone-shaped end that blocks the passage when the screw is screwed all the way in. Furthermore, this screw is recessed, according to another feature of the invention, so that it presents no exterior projection which could be struck by a rock.

The above and other objects, features and advantages will become more readily apparent from the following description, reference being made to the drawing in which:

FIG. 1 is a sectional view through a four-cylinder fixed-yoke disk brake with a bleeding arrangement according to our invention;

FIG. 2 is a diagrammatic cross-sectional view through a two-cylinder floating-zone or caliper disk brake with a bleeding arrangement according to another aspect of our invention;

Figure 4:
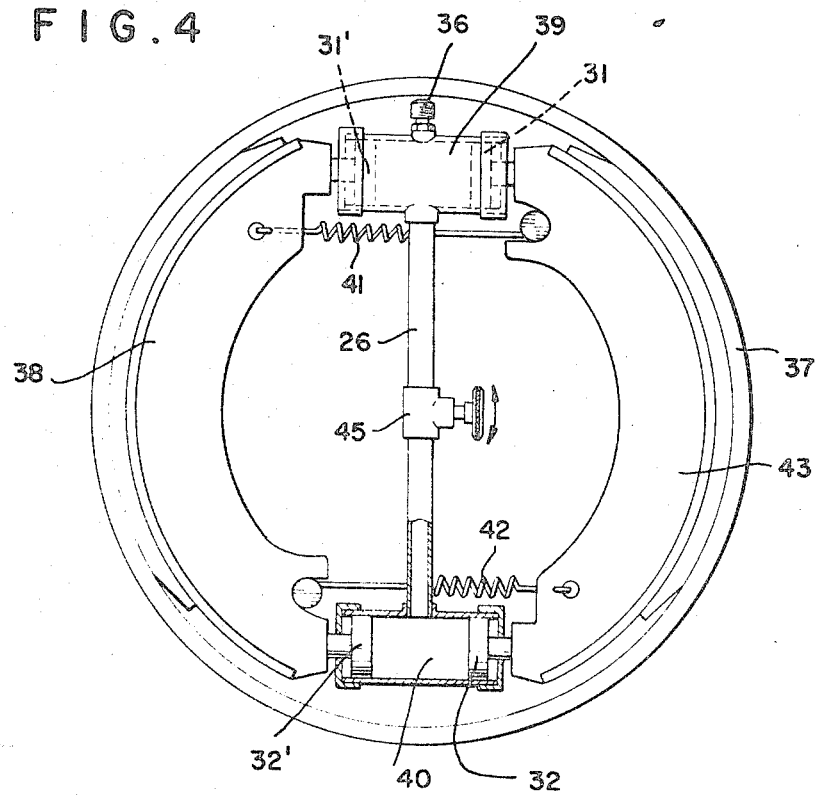
FIG. 4 is a side view, partly in section, of a dual-network drum brake with a bleeding arrangement according to our invention.

FIG. 1 shows a four-cylinder fixed-yoke disk brake with a housing 8 in which two opposed upper cylinders 9, 9' are jointly connected through channels 1d and 1e to one chamber of a dual master cylinder MC actuatable by a brake pedal P, and two lower cylinders 10, 10' are jointly connected through channels 2d and 2e to the other chamber of the master cylinder MC. Pistons 1, 1' are sealed with respect to the cylinders 9, 9' by annular gaskets 1a, 1a' and bear against backing plates 1b, 1b' respectively. Pistons 2, 2' are similarly sealed against the cylinders 10, 10' by gaskets 2a, 2a' and bear against backing plates 2b, 2b' respectively.

A brakeshoe lining 1c borne on the backing plates 1b, 2b can be urged against a disk 7 by the pistons 1, 2, as can the brakeshoe lining 1c' by the pistons 1', 2'.

An isolating screw 5 is shown blocking a passage 3 leading to chamber 9 with a cone-shaped end 5a so that the passage 3 does not communicate with a passage 4 leading to the cylinder 10, thereby hydraulically isolating the cylinders 9 and 10 from one another. The screw 5 is threaded into a packing nut 5b screwed, in turn, into the housing 8 and bearing upon a gasket 5c that annularly seals the screw 5 against leakage. Passages 13 and 14 from cylinders 9' and 10' respectively are sealed at one end by an isolating screw 15 with a gasket 15a whose functioning is analogous to that of screw 5.

At the highest point in the channel 1d, we provide a bleeder screw 6. The screw 6 has an axial channel 6a that is blocked when the screw 6 is fully screwed in.

This four-cylinder fixed-yoke brake operates in the usual manner: an actuation of the pedal P forces brake fluid from master cylinder MC into wheel-brake cylinders 9, 9', 10, and 10' thereby bringing pistons 1, 1', 2, and 2' to bear on the disk 7 via the brakeshoes 1b, 2b, 1c; 1b', 2b', 1c'. A failure of one brake line does not cause the other to lose pressure since they are hydraulically isolated from each other as long as the screws 5 and 15 are fully screwed in (i.e., in their "closed" positions).

To bleed this wheel brake one need only screw the screws 5 and 15 back to a slight extent, thereby allowing the lower cylinders 10, 10' to communicate with the upper cylinders 9, 9', and then unscrew the screw 6 enough to unblock the lower end of its axial passage 6a. Any air in any of the cylinders will automatically rise to the lower end of the screw 6 so that an application of the brakes, a depression of the brake pedal, will force it out through the passage 6a. Once all the air is bled off, which will be evident when brake fluid flows from passage 6a, one need only screw all the screws 5, 15, and 6 back in to isolate the cylinders 9, 9' the cylinders 10, 10' and to block off the passage 6a.

In this embodiment the screws 5, 15 are recessed in and do not project from the housing 8 so that they do not stand in danger of being struck by a rock caught by the wheel and thrown up against the brake or endangered in another manner.

FIG. 2 shows a two-cylinder floating-yoke disk brake. Here a housing 18 has two cylinders 19 and 20 slidably receiving pistons 11 and 12 respectively connected by means not illustrated to two different networks of a dual-network brake system. These pistons 11, 12 carry backing plates 11b, 12b respectively which form part of a single brake shoe 11c. On the other side of the brake disk 17 from this shoe 11c is a second brakeshoe 11c' whose backing plate 11b' is carried in turn on a member 18a of the housing 18 which is movable in the direction of the axes of the pistons 11, 12. An isolating screw 25 sealed with a gasket 25b blocks, with its cone-shaped end 25a, a passage 23 opening into the chamber 19. A lower passage 24 extends between the cylinder 20 and the body of the screw 25. A hole 16c in the top of the housing carries a bleeder screw 16 with an axial passage 16a opening radially into a cone-shaped end 16b and closed when the screw is fully screwed in.

The bleeding operation for this embodiment is similar to that of the FIG. 1 embodiment. The screws 26 and 16 are slightly loosened to allow passage 23 to communicate with passage 24 and to unblock the end of passage 16a. The brake is then applied and the air is bled out through hole 16a after which both screws 16 and 25 are turned in again.

Figure 3:
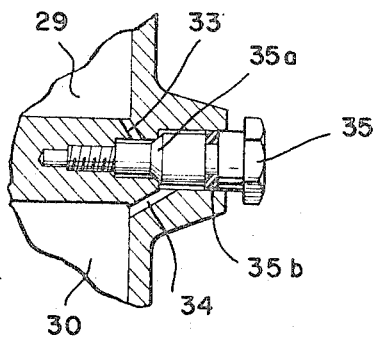
FIG. 3 is a sectional view through a further embodiment of a detail of a connecting-valve arrangement according to our invention.

FIG. 3 shows an isolating screw 35 sealed with a gasket 35b. This screw 35 has a cone-shaped formation 35a in its middle portion for isolating chambers 29 and 30 from each other through passages 33, 34. The screw 35 functions as the isolating screws of the previous embodiments. In addition, as with the screws 5 and 25 (FIGS 1 and 2 respectively), any air caught in the space left when the screw 5, 25, or 35 is retracted is flushed out by the brake fluid coming up from below from passage 4, 24, or 34 respectively.

In FIG. 4 our invention is applied to a dual-network drum brake. Here a cylinder 39 is connected through a conduit 26 and a slide valve 45 to a cylinder 40, each cylinder 39 or 40 being connected to a separate brake network by means not illustrated. Pistons 31 and 32 are connected to a brake shoe 43 inwardly biased by a spring 42 and the pistons 31', 32' to a brake shoe 38 inwardly biased by a spring 41. The cylinders 39 and 40 are connected to each other through the slide valve 45 which can isolate them from each other while a bleeder screw 36 like the screws 6 or 16 shown in FIGS. 1 and 2 is provided a top cylinder 39.

In this system, actuation of the brake pedal (not shown) brings hydraulic pressure to bear on the pistons 31, 31', 32, 32' forcing them axially outward thus bringing the brake shoes 38 and 43 to bear on a brake drum 37. In case of a failure of either network two pistons 31, 31', or 32, 32' will still be actuatable thereby making braking still possible.

Bleeding such a dual-network brake drum is executed as with the previous disk brakes. Here one need only open the slide valve 45 thereby connecting both cylinders 39 and 40 together and unscrew the screw 36 therefore connecting both networks to the bleeder opening. The brake is actuated to force the air up and out of both cylinders 39 and 40 through the bleeder screw 36, then the slide valve 45 is closed to re-isolate the two networks and the screw 36 is turned down again to prevent leakage.

We claim:

1. A dual-network brake system comprising:
a brake housing positioned adjacent a rotatable brake surface;
brakeshoe means in said housing shiftable against said surface;
a pair of brake cylinders formed in said housing;
respective pistons in said cylinders for displacing said brakeshoe means upon hydraulic pressurization of said cylinders;
a pair of hydraulic-fluid-supply networks respectively connected to said cylinders and individual thereto for hydraulic pressurization of said cylinders;
means forming a passage communicating between said cylinders and permitting fluid flow therebetween;
connecting-valve means along said passage for selectively blocking and admitting fluid flow between said cylinders, at least one of said cylinders being formed with a port communicating with the atmosphere and spaced from said passage; and
bleeder-valve means in said port and operable independently of connecting-valve means for bleeding both said cylinders through said port in an unblocked condition of said passage.

2. A dual-network hydraulic brake system comprising:
a rotatable brake disk;
a brake housing straddling said disk;
an upper cylinder and a lower cylinder formed in said housing to one side of said disk and a further upper and lower cylinder formed in said housing to the other side of said disk, said upper cylinders being at least partially above said lower cylinders, each of said cylinders being provided with a piston shiftable toward said disk;
a pair of brakeshoes on opposite sides of said disk;
a first hydraulic network connected to said upper cylinders and a second hydraulic network independent of said first network connected to said lower cylinders for pressurizing said cylinders and shifting said pistons toward said disk to displace said brakeshoes thereagainst, said housing being formed with an upper channel interconnecting said upper cylinders and a lower channel interconnecting said lower cylinders, said housing being formed to one side of said disk with a passage between said upper and lower cylinders and with another passage to the other side of said disk between the other upper and lower cylinders, said passages being formed with respective valve seats and said housing being formed with two respective bores between said seats and the exterior of said housing, said second network opening into said lower cylinders below said passages;
a pair of respective screws in said bores engageable with said seats to block said passages; and
bleeder means independent of said screws including a closable bleeder opening in the top of said housing communicating with the upper channel and with said lower cylinders through said passages, whereby air in said lower cylinders can be bled out through said passages, said upper cylinders, said upper channel, and said opening, and air in said upper cylinders bleeds out directly through said upper channel and opening.

3. The system defined in claim 2 wherein said cylinders and bores extend substantially parallel to one another, said upper channel comprising two sections having a junction at said bleeder opening and extending downwardly therefrom to said upper cylinders.

4. A dual-network hydraulic brake system comprising:
a rotatable brake disk;
a brake housing straddling said disk;
an upper cylinder and a lower cylinder formed in said housing to one side of and opening toward said disk, said upper cylinder being at least partially above said lower cylinder, each of said cylinders being provided with a piston shiftable toward said disk;
a pair of brakeshoes on opposite sides of said disk;
a first hydraulic network connected to said upper cylinder and a second hydraulic network independent of said first network connected to said lower cylinder for pressuring said cylinders and shifting said pistons toward said disk to displace at least one of said brakeshoes thereagainst, said housing being formed with a passage between the uppermost portion of the lower cylinder and the upper cylinder, said passage being formed with a valve seat and said housing being formed with a bore between said seat and the exterior of said housing, said second network opening into said lower cylinder below said passage;

a screw in said bore engageable with said seat to block said passage; and bleeder means independent of said screw including a closable bleeder opening in the top of said housing communicating with the uppermost portion of said upper cylinder and with said lower cylinder through said passage, whereby air in said lower cylinder can be bled out through said passage, said upper cylinder, and said opening, and air in said upper cylinder can bleed directly out through said opening.

5. The system defined in claim 4 wherein said pistons are substantially parallel and said bore extends substantially parallel thereto.

6. The system defined in claim 4 wherein said passage is formed with a straight upper section connected by one end to said upper cylinder and with a straight lower section connected by one end to said lower cylinder, a junction formed with said valve seat being provided at the other ends of said sections.

7. The system defined in claim 6 wherein the lower section is inclined to the horizontal and the upper section and said screw are substantially horizontal.

8. The system defined in claim 6 wherein said screw is formed with a cone-shaped region with a longitudinal axis corresponding substantially to the longitudinal axis of said screw, said cone-shaped region being sealingly engageable with said valve seat.

9. The system defined in claim 8 wherein said housing is formed with a side wall provided with a first substantially horizontal threaded bore, a packing nut being receivable in said threaded bore, said nut being formed with a second substantially horizontal bore for threadedly receiving said screw, an annular gasket being clamped between said nut and said housing for annularly sealing the screw.

10. The system defined in claim 6 wherein said screw is formed with a substantially flat end facing the valve seat, said screw being displaceable to bring said flat end to bear on the valve seat thereby blocking said passage.

11. The system defined in claim 10 wherein said screw is recessed in said housing.

References Cited

UNITED STATES PATENTS

| | | | |
|---|---|---|---|
| 940,163 | 10/1909 | Kiel | 251—214 X |
| 1,698,439 | 1/1929 | Johnson | 251—214 |
| 2,389,978 | 11/1945 | House | 188—152.14 |
| 2,976,009 | 3/1961 | Hartmann | 251—214 X |
| 3,047,097 | 7/1962 | Rockwell | 188—152.14 |

GEORGE E. A. HALVOSA, Primary Examiner